US010943122B2

(12) United States Patent
Narasimha et al.

(10) Patent No.: US 10,943,122 B2
(45) Date of Patent: *Mar. 9, 2021

(54) FOCALIZED BEHAVIORAL MEASUREMENTS IN A VIDEO STREAM

(71) Applicants: Ramya Narasimha, Palo Alto, CA (US); Hector H. Gonzalez-Banos, Mountain View, CA (US)

(72) Inventors: Ramya Narasimha, Palo Alto, CA (US); Hector H. Gonzalez-Banos, Mountain View, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/588,633

(22) Filed: Sep. 30, 2019

(65) Prior Publication Data
US 2020/0026926 A1 Jan. 23, 2020

Related U.S. Application Data

(63) Continuation-in-part of application No. 16/386,239, filed on Apr. 16, 2019, which is a continuation-in-part
(Continued)

(51) Int. Cl.
*G06K 9/00* (2006.01)
*G06F 16/78* (2019.01)
(Continued)

(52) U.S. Cl.
CPC .......... *G06K 9/00711* (2013.01); *G06F 16/71* (2019.01); *G06F 16/735* (2019.01);
(Continued)

(58) Field of Classification Search
CPC ........... G06K 9/00221; G06K 9/00228; G06K 9/00281; G06K 9/00288; G06K 9/00295;
(Continued)

(56) References Cited

U.S. PATENT DOCUMENTS 6,496,856 B1 12/2002 Kenner et al.
8,311,277 B2 11/2012 Peleg et al.
(Continued)

FOREIGN PATENT DOCUMENTS

EP 0 932 298 7/1999
EP 3 070 938 9/2016
(Continued)

OTHER PUBLICATIONS

Office Action for JP Application No. 2019-029024, dated Feb. 20, 2020, 10 pgs. (with translation).
(Continued)

*Primary Examiner* — Nicholas T Corbo
(74) *Attorney, Agent, or Firm* — Patent Law Works LLP

(57) ABSTRACT

A system and method for analyzing behavior in a video is described. The method includes extracting a plurality of salient fragments of a video; generating a focalized visualization, based on a time anchor, from one or more of the plurality of salient fragments of the video; tagging a human subject in the focalized visualization with a unique identifier; and analyzing behavior of the human subject, using the focalized visualization, to generate a behavior score associated with the unique identifier and the time anchor.

20 Claims, 11 Drawing Sheets

US 10,943,122 B2

Page 2

Related U.S. Application Data of application No. 15/916,997, filed on Mar. 9, 2018, now Pat. No. 10,719,552, which is a continuation-in-part of application No. 15/453,722, filed on Mar. 8, 2017, now Pat. No. 10,708,635, which is a continuation-in-part of application No. 15/447,416, filed on Mar. 2, 2017, now Pat. No. 10,720,182.

(51) Int. Cl.
*G06F 16/74* (2019.01)
*G06F 16/71* (2019.01)
*G06F 16/783* (2019.01)
*G06F 16/735* (2019.01)

(52) U.S. Cl.
CPC .......... *G06F 16/743* (2019.01); *G06F 16/784* (2019.01); *G06F 16/7867* (2019.01); *G06K 9/00228* (2013.01); *G06K 9/00335* (2013.01); *G06K 2009/00738* (2013.01)

(58) Field of Classification Search
CPC .......... G06K 9/00308; G06K 9/00315; G06K 9/00335; G06K 9/00718; G06K 9/00744; G06K 9/00751; G06K 9/00765; G06K 9/00771; G06K 9/46; G06K 2009/00738; G06T 7/73; G06F 16/739; G06F 16/743; G06F 16/784; G06F 16/71; G06F 16/7867; G06F 16/735
See application file for complete search history.

(56) References Cited

U.S. PATENT DOCUMENTS

| | | | |
|---|---|---|---|
| 8,949,235 | B2 | 2/2015 | Peleg et al. |
| 10,204,264 | B1* | 2/2019 | Gallagher ........ H04N 21/44218 |
| 2002/0071556 | A1 | 6/2002 | Moskowitz et al. |
| 2002/0071596 | A1 | 6/2002 | Estevez |
| 2002/0172394 | A1 | 11/2002 | Venkatesan et al. |
| 2002/0178368 | A1 | 11/2002 | Yin et al. |
| 2003/0058939 | A1 | 3/2003 | Lee et al. |
| 2003/0174773 | A1 | 9/2003 | Comaniciu et al. |
| 2003/0194131 | A1 | 10/2003 | Zhao et al. |
| 2004/0098376 | A1 | 5/2004 | Li et al. |
| 2004/0225640 | A1 | 11/2004 | Brown et al. |
| 2005/0240980 | A1 | 10/2005 | Jun et al. |
| 2006/0064411 | A1 | 3/2006 | Gross et al. |
| 2007/0055695 | A1 | 3/2007 | Dorai et al. |
| 2007/0101147 | A1 | 5/2007 | Brunk et al. |
| 2007/0136656 | A1 | 6/2007 | Nydam et al. |
| 2008/0066136 | A1 | 3/2008 | Dorai et al. |
| 2008/0150431 | A1 | 6/2008 | Preston |
| 2008/0208828 | A1 | 8/2008 | Boiman et al. |
| 2008/0221401 | A1 | 9/2008 | Derchak et al. |
| 2010/0045799 | A1 | 2/2010 | Lei et al. |
| 2010/0082575 | A1 | 4/2010 | Walker et al. |
| 2010/0088406 | A1 | 4/2010 | Yu et al. |
| 2011/0052144 | A1 | 3/2011 | Abbas et al. |
| 2011/0285748 | A1 | 11/2011 | Slatter et al. |
| 2013/0036124 | A1 | 2/2013 | Ambwani et al. |
| 2013/0156277 | A1* | 6/2013 | Sasaki ................ G06K 9/00302 382/118 |
| 2013/0290249 | A1 | 10/2013 | Merriman et al. |
| 2014/0047558 | A1 | 2/2014 | Veerubhotla et al. |
| 2014/0188840 | A1 | 7/2014 | Agarwal et al. |
| 2014/0324864 | A1 | 10/2014 | Choe et al. |
| 2015/0044657 | A1 | 2/2015 | Dalal et al. |
| 2015/0254513 | A1 | 9/2015 | Mansour et al. |
| 2015/0269231 | A1 | 9/2015 | Huynh et al. |
| 2016/0019239 | A1 | 1/2016 | Bastaldo-Tsampalis et al. |
| 2016/0049173 | A1 | 2/2016 | Anderson et al. |
| 2016/0071242 | A1 | 3/2016 | Uralsky et al. |
| 2016/0253576 | A1* | 9/2016 | Kilpatrick .......... G06K 9/00771 382/103 |
| 2016/0275356 | A1 | 9/2016 | Kuwahara et al. |
| 2016/0323658 | A1 | 11/2016 | Richardson |
| 2017/0339238 | A1 | 11/2017 | Qin |
| 2018/0115788 | A1 | 4/2018 | Burns et al. |
| 2018/0205905 | A1 | 7/2018 | Hammar et al. |
| 2018/0376224 | A1 | 12/2018 | Chun et al. |

FOREIGN PATENT DOCUMENTS

| | | |
|---|---|---|
| JP | H10-84525 | 3/1998 |
| JP | H10-240774 | 9/1998 |
| JP | 2000056681 A | 2/2000 |
| JP | 2001024880 A | 1/2001 |
| JP | 2002-170104 | 6/2002 |
| JP | 2002-538642 | 11/2002 |
| JP | 2003-30204 | 1/2003 |
| JP | 2005-123824 | 5/2005 |
| JP | 2005346658 A | 12/2005 |
| JP | 2007-267294 | 10/2007 |
| JP | 2007-282268 | 10/2007 |
| JP | 2009-27564 | 2/2009 |
| JP | 2009-516257 | 4/2009 |
| JP | 2012199721 A | 10/2012 |
| JP | 2014-112280 | 6/2014 |
| JP | 2014-155190 | 8/2014 |
| JP | 2015-114685 | 6/2015 |

OTHER PUBLICATIONS

Extended European Search Report for EP Application No. 18156914.6, dated Apr. 4, 2018, 9 pgs.
Extended European Search Report for EP Application No. 18158918.5, dated Apr. 4, 2018, 9 pgs.
Apache, "Kafka 0.9.0 Documentation," documented on archive.org as of Nov. 20, 2015, https://web.archive.org/web/20151120080338/https://kafka.apache.org/090/documentation.html, 2015, 95 pgs.
Atrey et al., "A Hierarchical Signature Scheme for Robust Video Authentication Using Secret Sharing," Multimedia Modelling Conference, 2004, Proceedings, 10th International, IEEE, 8 pgs.
Author Unknown, "Apache Kafka is a Distributed Streaming Platform. What Exactly Does that Mean?" retrieved from https://kafka.apache.org/intro on Jul. 13, 2017, 2 pgs.
Bastan et al., "BilVideo-7: an MPEG-7—compatible video indexing retrieval system," dated Jul. 2010, 11 pgs.
Bligh, "What is Distributed Storage and Why Use It," Flexiant, Jul. 26, 2013, retrieved on Jun. 14, 2018, from http://www.flexiant.com, 4 pgs.
BriefCam, BriefCam White Paper, White Paper; Video Synopsis Technology, 2010, 2 pgs.
Chang et al., "Robust Image Authentication Using Content Based Compression," Multimedia Systems 9, No. 2, 2003, pp. 121-130.
Dittmann et al., "Multimedia and Security," Workshop at ACM Multimedia '98, Bristol, UK, Sep. 12, 1998, 137 pgs.
Kreps, "The Log: What Every Software Engineer Should Know about Real-Time Data's Unifying Abstraction," retrieved from https://engineering.linkedin.com/distributed-systems/log-what-every-software-engineer-should-know-about-real-time-datas-unifying, Dec. 16, 2013, 29 pgs.
Lin et al., "Detection of Image Alterations Using Semi-Fragile Watermarks," Security and Watermarking of Multimedia Contents II. vol. 3971, International Society for Optics and Photonics, 2000, 12 pgs.
Lin et al., "Video and image watermark synchronization," Center for Education and Research in Information and Security, 2005, 238 pgs.
Lin, "Watermarking and Digital Signature Techniques for Multimedia Authentication and Coypright Protection," internet citation, Jan. 1, 2000, retrieved from http://citeseerx.ist.psu.edu/viewdoc/summary?doi=10.1.1.32.5211, pp. 1-258.
Manaf et al., "Review of Robust Video Watermarking Methods for Copyright Protection Application," International Journal of Video & Image Processing and Network Security, vol. 16, No. 3, Jun. 2016, 8 pgs.

(56) References Cited

OTHER PUBLICATIONS

Milano, "Content control: Digital watermarking and fingerprinting," White Paper, Rhozet, a business unit of Harmonic Inc., May 30, 2012, 11 pgs.
Office Action for JP Application No. 2018-032691, dated Feb. 19, 2019, 10 pgs. (with translation).
Office Action for JP Application No. 2018-036253, dated Feb. 26, 2019, 7 pgs. (with translation).
Pritch et al., Clustered Synopsis of Surveillance Video, 6th IEEE Int. Conf. on Advanced Video and Signal Based Surveillance, Sep. 2-4, 2009, 6 pgs.
Rigoni et al., "Detecting tampering in audio-visual content using QIM watermarking," Information Sciences 328, 2016, pp. 127-143.
Schneider, "What's the Difference Between Message Centric and Data Centric Middleware?" dated Jul. 6, 2012, retrieved from http://electronicdesign.com/embedded/whats-difference-between-message-centric-and-data-centric-middleware, 5 pgs.
Wang et al., "A Video Watermarking Scheme Based on Motion Vectors and Mode Selection," Computer Science and Software Engineering, 2008 International Conference on, vol. 5, IEEE, 5pgs.
Yang et al., "Research of Digital Watermarking Algorithm Based on SVD and DWT," Applied Mechanics and Materials, vol. 65, Trans Tech Publications, 2011, 4 pgs.
Panchanathan, Seturaman et al., "Parallel and Distributed Processing (IPDPS 2000 Workshops)".
Summons to Attend Oral Proceedings for EP Application No. 18158918.5, mailed Jul. 30, 2020, 22 pgs.
Universal Class, "Class Syllabus: Workplace Safety 101", Jun. 25, 2010, Universal Class https://web.archive.org/web/20100625130929/https://www.universalclass.conrili/course/workplacesafety/syllabus.htm, pp. 1-4 (Year: 2010).
Extended European Search Report for EP Application No. 20174157.6, dated Sep. 10, 2020, 10 pgs.
Nie, Yongwei, et al., "Compact Video Synopsis via Global Spatiotemporal Optimization", IEEE Transactions on Visualization and Computer Graphics, vol. 19, No. 10, Oct. 2013, pp. 1664-1676.

\* cited by examiner

FOCALIZED BEHAVIORAL MEASUREMENTS IN A VIDEO STREAM

CROSS REFERENCE TO RELATED APPLICATIONS

This application is a continuation-in-part of U.S. patent application Ser. No. 16/386,239, filed Apr. 16, 2019, and entitled "Focalized Behavioral Measurements In A Video Stream," which is a continuation-in-part of U.S. patent application Ser. No. 15/916,997, filed Mar. 9, 2018, and entitled "Focalized Summarizations of a Video Stream," which is a continuation-in-part of U.S. patent application Ser. No. 15/453,722, filed Mar. 8, 2017, and entitled "Subsumption Architecture for Processing Fragments of a Video Stream," which is a continuation-in-part of U.S. patent application Ser. No. 15/447,416, filed Mar. 2, 2017, and entitled "Decomposition of a Video Stream into Salient Fragments," all of which are incorporated herein by reference in their entirety.

BACKGROUND

1. Field of the Invention

The specification generally relates to processing a video stream. In particular, the specification relates to a system and method for creating, storing, and retrieving salient fragments to generate a focalized visualization related to a location, an event, or a subject of interest. The specification further relates to analyzing the behavior of an object of interest in the focalized visualization.

2. Description of the Background Art

Historically, video surveillance has been performed using cameras to transmit a video signal to a limited set of monitors based on switching video signals (e.g., closed-circuit television systems). With the transition to the digital era video management systems or digital video recorders which distribute video streams and provide video analytics, the video surveillance paradigm remains the same. The video analytics may be, for example, the capability of automatically analyzing video to detect and determine temporal and spatial events. However, the predominant paradigm to distribute video streams remains connection-centric and it is mainly concerned with routing video from cameras to storage and displays. As a result, the video analytics provided by the industry now follows a monolithic architecture.

The current video analytics architecture is monolithic because functionally distinguishable analytics tasks (e.g., data input and output, data processing, error handling, and the user interface) are interwoven and not separable into sub-tasks. One way to get a less monolithic architecture is edge analytics, which allows one or more analytics to be performed at the camera side or close to the camera. Edge analytics may be a form of distributed analytics, but this property on its own does not guarantee a separable design. Another solution might be a distributed system. The distributed system may be distributed in the sense that system components are located on networked computers and can communicate with each other to perform functionality; however, the distributed system can nevertheless be monolithic because it is difficult to scale with increasing number of components or rising task complexity. For example, the traditional telephone exchange system was a distributed system that was hard to expand and maintain.

Current video management systems suffer from some other issues. For example, typical surveillance systems only contain a core analyzer whether on premise or in the cloud. In addition, current surveillance products favor a certain system deployment, i.e., enterprise-like systems where many vendors sell servers, switches, and storage to handle many cameras deployed within the same LAN or Intranet. As a result, video analytics using these surveillance products merely scale with the number of video streams within a site. More importantly, the prevailing paradigm emphasizes surveillance deployments of "few locations with many cameras" whereas deployments of "many locations with few cameras" are underserved.

In addition to the issues discussed above, the current video management systems also lack an efficient way to detect an event-of-interest and produce a video summarization as-needed that accurately reflects a scenario of the event along with analysis of the event.

SUMMARY

The techniques introduced herein overcome the deficiencies and limitations of the prior art, at least in part, with a system and method for: extracting a plurality of salient fragments of a video; generating a focalized visualization, based on a time anchor, from one or more of the plurality of salient fragments of the video; tagging a human subject in the focalized visualization with a unique identifier; and analyzing behavior of the human subject, using the focalized visualization, to generate a behavior score associated with the unique identifier and the time anchor.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
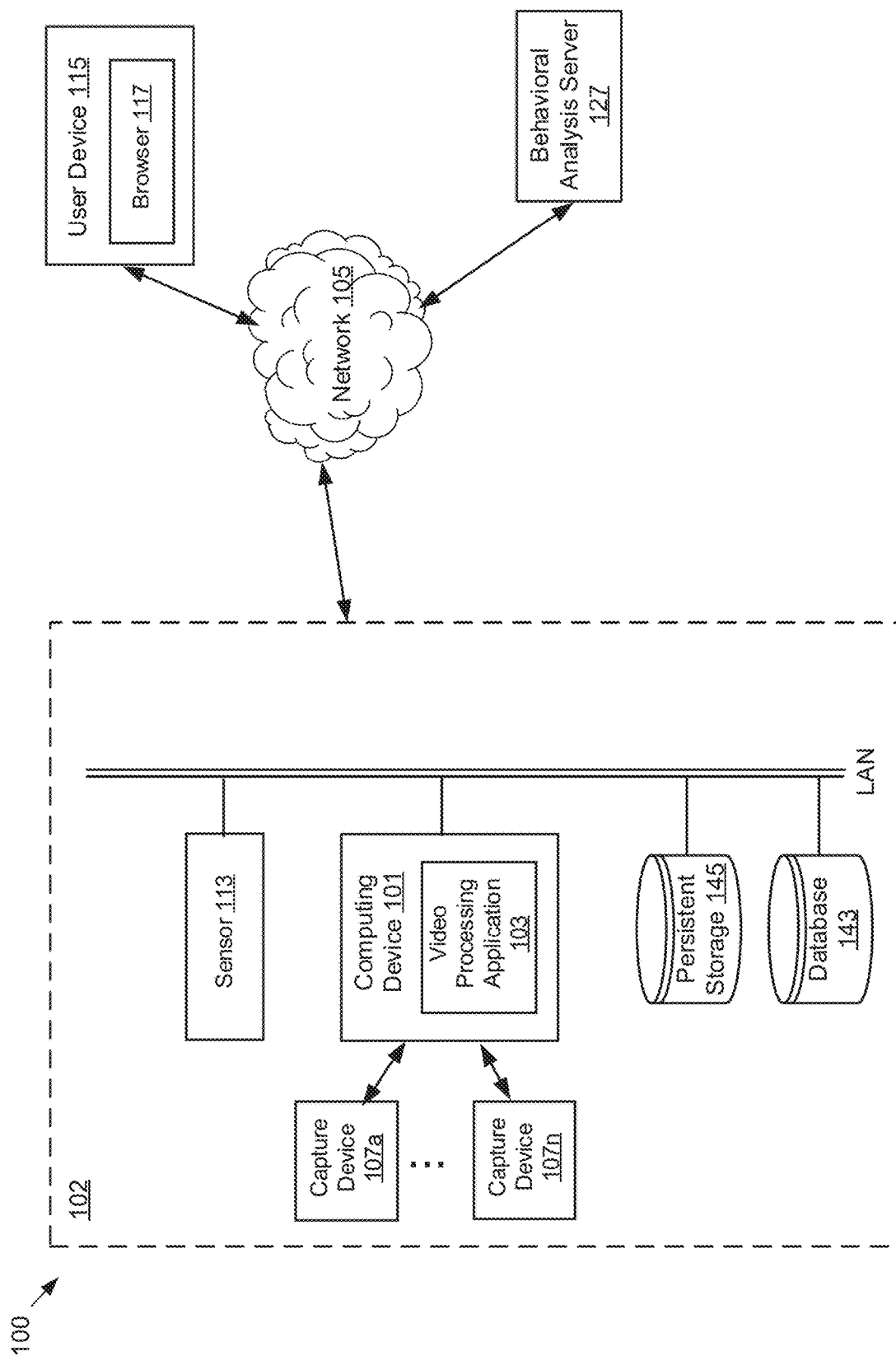
FIG. 1 depicts a high-level block diagram illustrating one embodiment of a system for creating, storing, and retrieving focalized behavioral measurements in a video stream.

Described herein is a system and method for performing a focalized analysis of the behavior of human subjects in a video stream. Focalized behavior analysis refers to measuring certain types of behavior during certain instances of time. For example, one could determine if trainees paid attention to certain important aspects of a training session. As described in more detail below, using a time anchor (e.g., a key time) at which a certain aspect of the training happens (e.g., an instance when a keyword occurs or when a task was displayed), the behavior of the individuals in the training session may be determined. For example, it may be determined whether an individual is facing in a particular direction or viewing a particular display at the key time. Additionally, it may be determined that the individual performs a particular action at the key time. Further, an emotion of the individual may be determined at the key time. It should be understood that additional behavioral analysis may be made at the key time.

Based on the behavioral determinations, a score may be assigned to each individual at every time anchor in a video stream. If such a behavior analysis were performed on the entire duration of the video stream without focalization on the specific instances of the time anchors, the score obtained would have little or no meaning because the behavior would regress to the behavioral mean. For example, during a one-hour training session, the average attention of a participant over the entire 60 minutes would likely be low. Similarly, the average mood of each participant would tend to be neutral for the entire session. In both of these examples, one risks making incorrect inferences if a score based on behavioral determinations is aggregated over the entire time.

Behavioral analysis often relies on micro-expressions or other short-lived behavioral cues. Due to their short-lived nature, behavioral cues typically last only a few seconds. Over longer periods, the typical expression or behavioral cue will revert to the temporal mean. The "spectrum" of the behavior thus flattens, analogous to what occurs to audio signals after time-average filtering. On the other hand, aggregating the behavioral analysis across a set of time anchors limits temporal flattening.

As described herein, the focus of the behavioral analysis is controlled through selection of time anchors. The time anchors may originate from external triggers, events, or other variables. In one embodiment, given a list of keywords and a transcript of a meeting, audio keyword extraction may be performed to compute the set of time anchors and the behavioral analysis thus focuses on the keywords. In another embodiment, the time anchors may correspond to when an advertisement or set of advertisements appear on a digital sign and the behavioral analysis focuses on the instants when an advertisement is displayed. In yet another embodiment, the time anchors correspond to particular states or conditions of a machine operated by a human operator. It should be apparent that the set of time anchors may originate from keywords, advertisements, states or conditions of a machine, or any other external trigger, event or variable. Thus, the behavioral analysis can be focalized on any sort of event from which temporal anchors can be derived.

Focalizing on time anchors allows for analysis of the behavior of an individual at the most relevant time and therefore, provides a meaningful assessment of the scenario or the individual or the task.

FIG. 1 depicts a high-level block diagram illustrating one embodiment of a system 100 for creating, storing, and retrieving focalized behavioral measurements in a video stream. The illustrated system 100 includes a video processing system 102 including a computing device 101, capture devices 107a . . . 107n, a sensor 113, a database 143, and a persistent storage 145. In the illustrated embodiment, the computing device 101, capture devices 107a . . . 107n, a sensor 113, a database 143, and a persistent storage 145 may be connected in a local area network (LAN) and are further communicatively coupled to other entities of the system 100 via a network 105. In other embodiments, the database 143 and/or the persistent storage 145 may be located remotely and coupled to other entities of the system 100 via the network 105. The system 100 may further include a user device 115 and a behavior analysis server 127. The components of the system 100 are described in more detail below.

Although definite numbers of components are shown in FIG. 1, it should be understood that there may be any number of such components. Also, such entities can be connected by any number of networks and/or LANs. Further, in FIG. 1 and the remaining figures, a letter after a reference number, e.g., "107a," represents a reference to the element having that particular reference number. A reference number in the text without a following letter, e.g., "107," represents a general reference to instances of the element bearing that reference number.

Video processing system 102 decomposes a video stream into a plurality of salient fragments as described in U.S. patent application Ser. No. 15/447,416, filed Mar. 2, 2017 and entitled "Decomposition of a Video Stream into Salient Fragments," (the '416 Application), the contents of which are incorporated herein in its entirety. A salient fragment corresponds to a salient object in the video stream, where saliency can be determined based on motion, color, contrast, semantic information, etc. As described, a salient fragment is a sub-stream for a single salient activity localized in both time space and image space. As time evolves, a salient fragment may split into further fragments, or two or more salient fragment can merge into a single one.

As described in the '416 Application, a fragment can in turn be divided into short segments of fixed time duration for implementation convenience. In one embodiment, each segment is a one-second transport stream file in MPEG format (MPEG-TS). After video decomposition, the segments are stored and indexed in a database. Portions of the salient fragment (e.g., certain segments) instead of the entire salient fragment can be retrieved and returned to a user responsive to a query from the user. In other embodiments, as described in more detail below, a time anchor and duration may be used to retrieve a portion of a salient fragment and generate a focalized visualization around the time anchor. Additionally, a query may be used to generate a video segment (e.g., a focalized visualization) which can further be broken down into one or more focalized visualizations based on one or more time anchors.

In certain embodiments, the video stream is decomposed into a single fragment, but said single fragment is still subdivided into segments and indexed into a database.

The capture device 107 is a hardware device that captures video and associates metadata with the video. For example, the capture device 107 can be a digital video camera, a web cam, an IP camera, etc. The video captured by the capture device 107 can be any series of time-related images. The capture device 107 associates metadata with the video, for example, a time and a location at which the video was captured, an image size, an image resolution, color depth, a frame rate, etc.

The sensor 113 is a hardware device that detects and responds to input from a physical environment. The sensor 113 is coupled to the LAN and/or the network 105 to provide information or signals about the physical environment. Although a single sensor is depicted in the example of FIG. 1, a series of sensors, or a grid or array of sensors may be located in different LANs and coupled to the network 105. The sensor(s) can be a beacon for detecting the location and orientation of a user. For example, the sensor(s) may be a global positioning system sensor, a Wi-Fi sensor, a micro electro mechanical system sensor, a Bluetooth beacon such as a Bluetooth low-energy beacon, an ultrasonic beacon, a depth sensor, a video camera, a sensor using cellular positioning, near field communications, video location, and other positioning techniques. Other types of sensors may include, but not are limited to, a motion sensor such as a gyroscope, a proximity sensor, a radio frequency detector, an accelerometer, an ambient light sensor, a thermal sensor, a biometric sensor, etc.

The computing device 101 is a hardware device/server that performs video processing on a video stream. In some embodiments, the computing device 101 connects with the capture device 107 to receive a video stream for processing. In some embodiments, the computing device 101 connects to a single capture device or connects multiple capture devices. The computing device 101 receives an input video stream from the attached capture device 107, and generates video segments.

In some embodiments, the computing device 101 includes a video processing application 103. In some embodiments, the video processing application 103 can be implemented using programmable or specialized hardware. In some embodiments, the video processing application 103 can be implemented using a combination of hardware and software. In other embodiments, the video processing application 103 may be software stored and executed on the computing device 101.

In some embodiments, the video processing application 103 receives a video from a capture device and decomposes the video into fragments as described in the '416 Application. A salient fragment of the video is a subset of frames of the video and a subset of pixels from the subset of frames. For example, pixels corresponding to an object in the video may be found in multiple frames of the video. These frames with the pixels corresponding to an object may be extracted from the video as a subset of frames. Further, the pixels corresponding to the object (and in some embodiments, some pixels surrounding the object) are extracted from each of the subset of frames. The resulting subset of frames including only the pixels associated with the object are a salient fragment.

The video processing application 103 breaks the salient fragments into segments of short duration (e.g., one second, three seconds, etc.) and associates the segments with metadata as described in U.S. patent application Ser. No. 15/916,997, filed Mar. 9, 2018 and entitled "Focalized Summarizations of a Video Stream," (the '997 Application), the entirety of which is incorporated herein by reference. The segment metadata includes at least one of a start time of a segment, a time duration of the segment, a number of frames included in the segment, an index of key frames, a frame width, a frame height, a camera identifier, a location of the camera, a site description and a camera configuration used to capture the segment, etc. In some embodiments, the segment metadata also includes relationship information between segments such as a spatio-temporal relationship or a cause-and-effect relationship. In other embodiments, the segment metadata further includes saliency attributes such as a motion saliency attribute, the presence of objects or people in the segment, etc. The segments generated by the video processing application 103 may be stored in persistent storage 145 and an index of the segments, including the metadata associated with each segment, is stored in database 143.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

The user device 115 is a computing device including a processor, a memory, applications, a database, and network communication capabilities. For example, the user device 115 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with other components of system 100. In some embodiments, the user device 115 includes a browser 117. The browser 117 is an application running on the user device 115 that locates, retrieves, and displays content for a user accessing the user device 115. For example, the browser 117 may communicate with a visualization application implemented on the behavioral analysis server 127 to pull the video content, using HTTP GET requests, for displaying to a user in response to the user's video content request. Further, the browser 117 may communicate with the behavioral analysis server 127 to retrieve a behavioral analysis of subjects in the video content. In some embodiments, the browser 117 may retrieve the behavioral analysis independently of video content. The browser 117 accesses the visualization and/or behavioral analysis through a URL assigned by the behavioral analysis server 127. Further, the user device 115 may present the visualization and/or the behavioral analysis to the user via browser 117.

The behavioral analysis server 127 may be either a hardware server, a software server, or a combination of software and hardware. The behavioral analysis server 127 may be, or may be implemented by, a computing device including a processor, a memory, applications, a database, and network communication capabilities. The behavioral analysis server 127 communicates with other entities of the system 100 via the network 105 to perform the functionality described herein.

Figure 2:
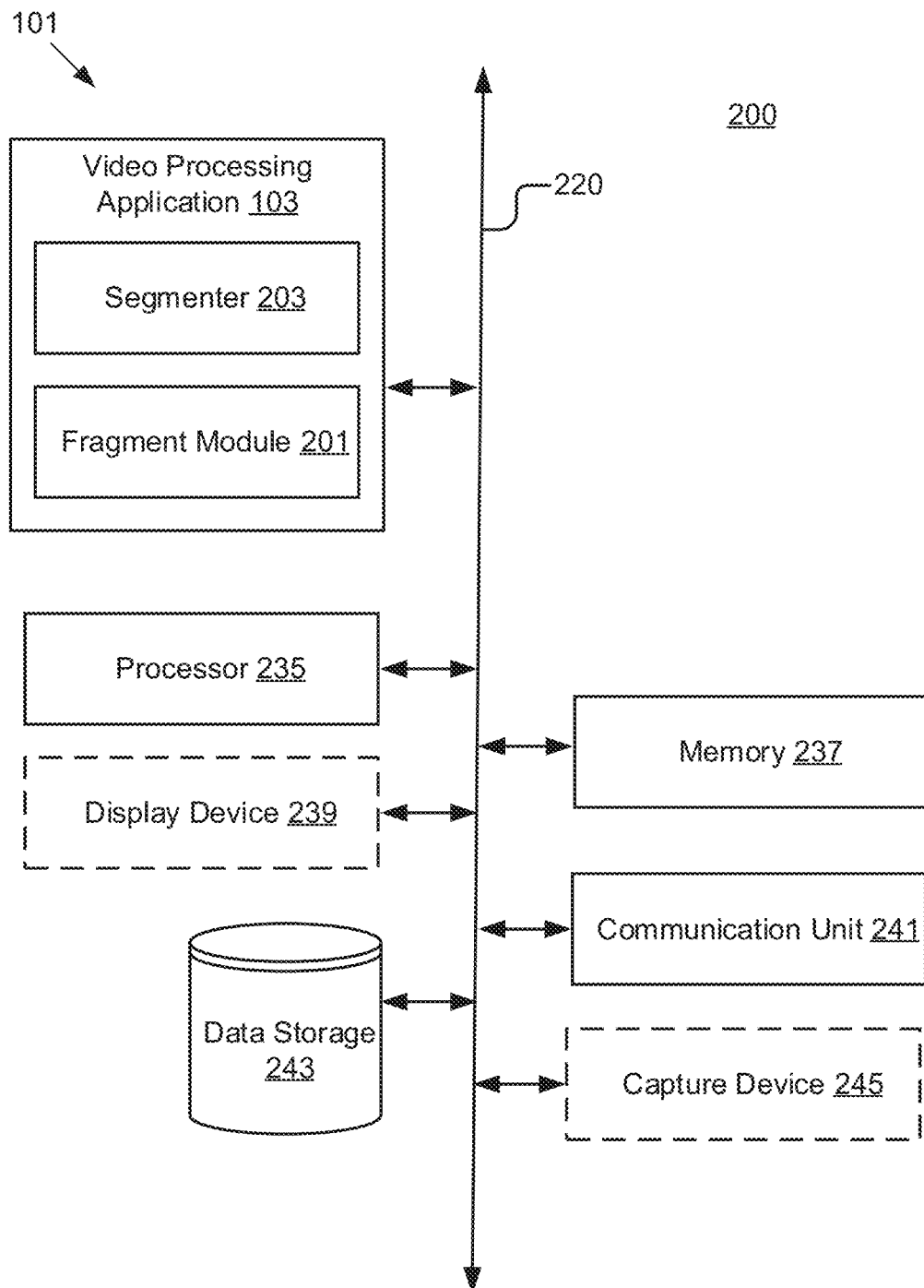
FIG. 2 depicts a block diagram illustrating one embodiment of a computing device including a video processing application according to the techniques described herein.

FIG. 2 depicts a block diagram illustrating one embodiment of a computing device 101 including a video processing application 103. In some embodiments, the computing device 101 is implemented as a system 200 which may also include a processor 235, a memory 237, an optional display device 239 and a capture device 245, a communication unit 241, and data storage 243 according to some examples. The components of the system 200 are communicatively coupled to a bus 220 for communication with each other.

The processor 235 may execute software instructions by performing various input/output, logical, and/or mathematical operations. The processor 235 may have various computing architectures to process data signals. The processor 235 may be physical and/or virtual and may include a single processing unit or a plurality of processing units and/or cores. In some implementations the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 237 via the bus 220 to access data and instructions therefrom and store data therein. The bus 220 may couple the processor 235 to the other components of the system 200 including, for example, the memory 237, the communication unit 241, the video processing application 103, and the data storage 243. It will be apparent to one skilled in the art that other processors, operating systems, and physical configurations are possible.

The memory 237 may store and provide access to data for the other components of the system 200. In some implementations, the memory 237 may store instructions and/or data that may be executed by the processor 235. The instructions and/or data may include code for performing the techniques described herein. For example, in one embodiment, the memory 237 may store the video processing application 103. The memory 237 is also capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, EPROM, ROM), a hard disk drive, an optical disk drive (CD. DVD, Blu-ray™, etc.) mediums, which can be any tangible apparatus or device that can contain, store, communicate, or transport instructions, data, computer programs, software, code, routines, etc., for processing by, or in connection with the processor 235. In some implementations, the memory 237 may include one or more of volatile memory and non-volatile memory. It should be understood that the memory 237 may be a single device or may include multiple types of devices and configurations.

The display device 239 may be a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the system 200. It should be noted that the display device 239 is shown in FIG. 2 with dashed lines to indicate it is optional. For example, the system 200 may be a server for performing video processing without a display device 239.

The communication unit 241 is hardware for receiving and transmitting data by linking the processor 235 to the network 105 and other processing systems. In one embodiment, the communication unit 241 may include a port for direct physical connection to the network 105. In another embodiment, the communication unit 241 may include a wireless transceiver (not shown) for exchanging data via network 105 using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated embodiment, the data storage 243 is communicatively coupled to the bus 220 to receive data for storage and provide data for retrieval upon a request for the data. The data storage 243 may store a video, fragments of the video, a database of face tags, etc.

The capture device 245 is a hardware device that captures video and associates metadata with the video. For example, the capture device 245 can be a digital video camera, a web cam, an IP camera, etc. The video captured by the capture device 245 can be any series of time-related images. The capture device 245 associates metadata with the video, for example, a time and a location at which the video was captured, an image size, an image resolution, color depth, a frame rate, etc. The capture device 245 is coupled to the bus 220 for communication with the processor 235 and the other components of the system 200. It should be noted that the capture device 245 is shown in FIG. 2 with dashed lines to indicate it is optional.

In some embodiments, the video processing application 103 includes a fragment module 201 and a segmenter 203.

The components of the video processing application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The fragment module 201 may include soft are logic to provide the functionality for decomposing a video into fragments. The video can be any series of time-related images. A fragment or fragment sequence is a subset of the video that includes multiple time-related images or frames of the video. Each frame of the fragment at a time instant includes a particular region that is slightly different and is connected in a certain continuity. For example, a salient fragment may include three time-related frames of an activity of waving hands. The first frame shows that a man is raising a hand to a first position. The second frame shows that the man is waving the hand at the first position. The third frame shows that the man is lowering the hand to a second position. A single salient fragment does not necessarily include a dramatic change of the particular region. That is, a salient fragment represents a sequence of small and/or steady changes in activity. Once the dramatic change occurs, for example, the region gets fractured, occluded, etc., a new salient fragment starts. For example, the salient fragment described above includes only three frames because the fourth frame that follows the third frame in the video does not contain the man's hand. In other words, a salient fragment is an atom of the original video that starts when a block of pixels appears in a scene and ends when the block of pixels disappears from the scene. In some embodiments, the fragment module 201 may include an encoder to perform the functionality described herein.

In some embodiments, the fragment module 201 determines saliency of objects, extracts salient objects from the video based on the saliency, and generates a plurality of salient fragments based on the salient objects. The saliency represents a pronounced feature of the video, and the corresponding salient fragment is a highlight of the video with noticeable quality that shows the pronounced feature. For example, the fragment module 201 extracts, from a surveillance video, a salient fragment including movements of a suspect, based on the most pronounced feature being a blacklisted individual (i.e., the salient object).

In some embodiments, the fragment module 201 determines saliency of objects in a video based on at least one of motion detection, contrast, color, and semantic properties. A salient object therefore may be an object that is moving or an object that is of certain color or certain contrast. The salient object may also be an object with semantic significance. For example, for a conversation video, the fragment module 201 may determine the person who did the most talking (e.g., answers other people's questions) as a salient object based on the semantic significance. Or, for example, the fragment module 201 may determine a car with a certain label as an object with semantic significance.

In some embodiments, the fragment module 201 uses a background and foreground separation method based on motion detection to identify a moving object as a salient object. For example, the fragment module 201 extracts a salient object of a train heading to a train station (e.g., the fast-changing portion) from a video, or the fragment module 201 identifies a moving object that is not in a predomination flow of moving objects in the video as a salient object. Motion detection methods may not be applicable in extracting salient objects when there are numerous moving objects in a scene, for example, a busy highway, a crowded store, etc. In such cases, the fragment module 201 may determine a salient object based on other characteristics of the video such as the contrast, the color, the shape, the semantic information of the video, etc. For example, the fragment module 201 identifies a person riding a bike as a salient object based on the semantic information including activities performed by objects in the video. The algorithms used in identifying salient objects include a Gaussian Mixture Models (GMM) based algorithm, a visual background extractor (ViBe), an adaptive GMM, a self-organizing map algorithm, a principal component analysis algorithm, an algorithm based on low-rank decomposition for modelling background, etc.

Once a salient object is determined, the fragment module 201 links the related portions of the salient object to generate a fragment. In some embodiments, the fragment module 201 determines salient objects in each frame of the video, tracks each salient object over the length of the video, and generates a plurality of fragments based on the tracks. A simple way to track the salient object is to locate the position of the salient object from one frame to another frame and associate the salient object in one frame to the salient object in the next frame that appears at a similar spatial location. However, this simple tracking method has some problems such as overlapping objects, false detection and resulted lack of association between objects, etc. To solve the problems, the fragment module 201 may use a tracking algorithm that associates a specific color model and/or a motion vector model to a salient object to obtain a track of the salient object over time. In some embodiments, the fragment module 201 applies a Hungarian method to determine when to start and stop tracks and uses a Kalman filter method to implement multiple object tracking.

In some embodiments, the fragment module 201 defines a track of a salient object as a fragment. This video fragment includes only the salient portion of the video and lasts for the time duration of the track and is therefore also referred to as a salient fragment. The salient fragment is a portion of the video for a single salient activity localized in time and space. In some embodiments, the fragment module 201 tracks a single salient object within a certain time period of the video and generates a single salient fragment from this specific time period. In other embodiments, the fragment module 201 tracks multiple salient objects within a certain time period of the video and generates multiple salient fragments from this specific time period of the video. For example, the fragment module 201 may track, from a three-minute period of the video, a person and a car, and generate a first fragment of the person and a second fragment of the car. In some embodiments, the fragment module 201 stores the fragments in a database. In other embodiments, the fragment module 201 transmits the fragments to the segmenter 203 for further processing.

The segmenter 203 may include software and/or logic to provide the functionality for breaking fragments into segments and identifying metadata associated with the segments. A segment is a sequence of standalone short clips. In some embodiments, the segment is of fixed duration, e.g., one second, five seconds, etc. In other embodiments, the segment is of varying length, e.g., a first segment is two-seconds long, a second segment is six-seconds long, etc. In some other embodiments, each segment corresponds to an individual frame in the video.

The segmenter 203 receives fragments of a video from the fragment module 201. In some embodiments, the segmenter 203 may include a decoder to decode the received encoded input video fragments and split the decoded video fragments into segments. In other embodiments, the segmenter 203 may perform the segmenting without transcoding, i.e., segmenting may be implemented without decoding the video and re-encoding the video using the same video codec. For example, the segmenter 203 receives the input video that is encoded with I-frames (e.g., key frames) aligning with the segment splits, and splits the video into segments without having to decode its contents. This "muxing without transcoding" simplifies the segmenting because it only changes the encapsulation of the video without touching the encoded contents.

In some embodiments, the segmenter 203 determines metadata associated with a segment. The metadata can be stored alongside or separately from the segment on database 143 and/or persistent storage 145. The metadata provides supplementary data of the segment ancillary to the video content. In some embodiments, the segmenter 203 determines the metadata including at least one of a start time of a segment, a time duration of the segment, an encoding status of the segment, a number of frames included in the segment, an index of key frames, a frame width, a frame height, a camera identifier, a presentation timestamp of each frame (PTS), and a decoding timestamp of each frame (DTS). In other embodiments, the segmenter 203 determines metadata information including a location of the camera, a site description and a camera configuration used to capture the segment.

In some embodiments, the segmenter 203 also includes relationship information between segments in segment metadata. In some embodiments, the segmenter 203 communicates with the fragment module 201 to determine a relationship between segments to reflect causality. For example, if a person causes an object to fall down upon entering a store and leaving the store, the segmenter 203 determines that a segment of the falling object is related to a segment of the person. The segment 203 includes a segment successor and a segment predecessor in segment metadata. In some embodiments, the segmenter 203 determines a relationship between segments based on spatial-temporal proximity of segments, e.g., if objects in two segments touch and/or influence each other at some point of time and at some point of the video. In some other embodiments, the segmenter 203 may further determine a relationship between segments based on the color, the shape, the contrast, or other properties.

The segmenter 203 annotates the segment with additional metadata. In some embodiments, the segmenter 203 determines information about the presence of objects or people in the segment. For example, the segmenter 203 annotates a segment with a set of objects that appear in the segment or whether a particular category or object is present. In another example, the segmenter 203 annotates the segment with metadata that denotes whether a human face or person appears in the segment. In other embodiments, the segmenter 203 uses attributes computed by a semantic analysis of the video content of a segment as metadata of the segment. For example, the segmenter 203 annotates a segment with a natural language description of its video content or annotates another segment with an activity that is taking place during the time span of the segment (and its predecessors and successors).

In some embodiments, annotations to a segment, i.e., metadata, may pertain to the complete segment, or may be restricted to some set of pixels from a set of frames in the segment. For example, the segmenter 203 annotates a segment as having a face, and further localizes the location of the face in image space and time within the segment.

Figure 3:
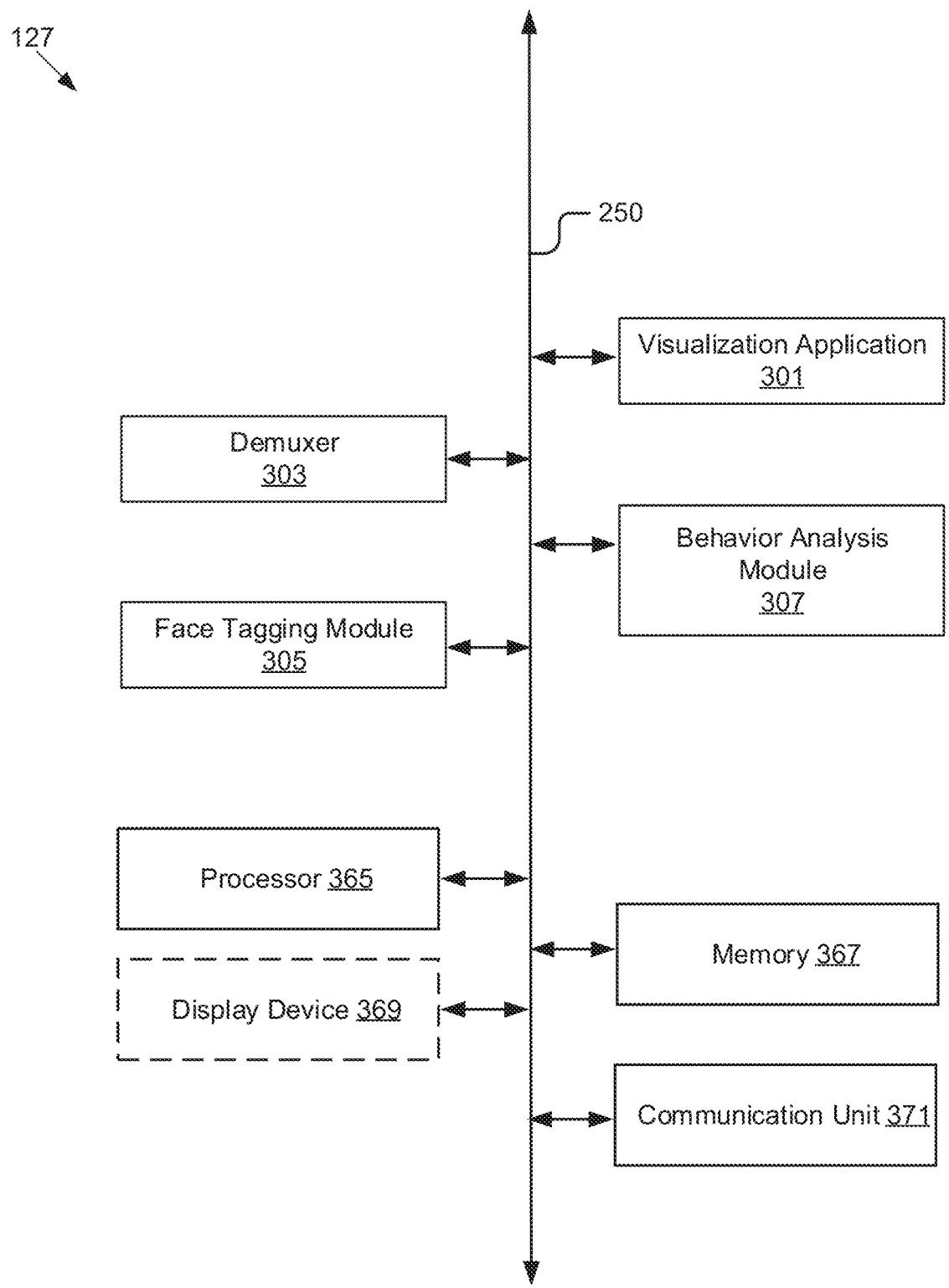
FIG. 3 depicts a block diagram illustrating one embodiment of a behavioral analysis server according to the techniques described herein.

FIG. 3 depicts a block diagram illustrating one embodiment of a behavioral analysis server 127 including a visualization application 301, a demuxer 303, a face tagging module 305, and a behavior analysis module 307. The behavioral analysis server 127 may also include a processor 365, a memory 367, an optional display device 369 and a communication unit 371, which perform similar functionality as that of 235, 237, 239, and 241 as described above with reference to FIG. 2, and therefore will not be repeatedly described here. The components of the behavioral analysis server 127 are communicatively coupled to a bus 250 for communication with each other.

Visualization application 301 can be implemented using programmable or specialized hardware. In some embodiments, the visualization application 301 can be implemented using a combination of hardware and software. In other embodiments, the visualization application 301 may be software stored and executed on the behavioral analysis server 127. Visualization application 301 works with other components of system 100 to produce a focalized visualization as described in the '997 Application. The focalized visualization may be isolated to a time anchor associated with an external trigger event (e.g., a keyword, display of media content, a machinery state, or various other external factors). While depicted as a component of the behavioral analysis server 127, it should be understood that the visualization application 301 may be implemented as part of computing device 101 or on other computing systems connected to network 105.

Figure 4:
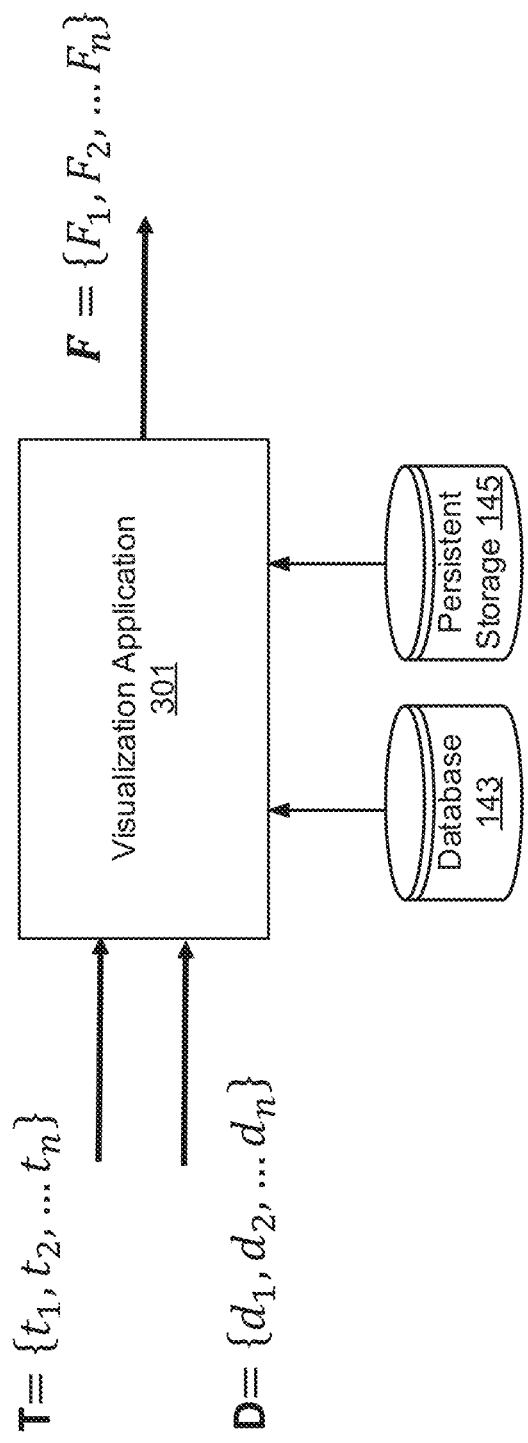
FIG. 4 illustrates an example of the inputs and output of visualization application according to the techniques described herein.

FIG. 4 illustrates an example of the inputs and output of visualization application 301. As described above, and in the '416 Application and '997 Application, a video stream is decomposed into salient fragments, which are further decomposed into segments. The fragments are in turn indexed into a database (e.g., database 143) and the segment files placed into persistent storage (e.g., persistent storage 145). In the described embodiment, decomposition and indexing are operations done prior to the analysis of the fragments.

Once the video is indexed, the system may retrieve segments and create a focalized visualization around one or more time anchors. For example, given the sets $T=\{t_1, t_2, \ldots t_n\}$ and $D=\{d_1, d_2, \ldots d_n\}$, where T is the set of time anchors (i.e., the time instances for which the visualizations are to be computed), and D is the set of durations (i.e., the duration for each visualization) a number n of focalized visualizations may be generated by the visualization application 301. In another embodiment, a query based on an external trigger (e.g., a discreet event, a time period, etc.) may be used to restrict the initial video input to a discrete time frame. The resultant visualization can further be broken down into one or more focalized visualizations based on one or more time anchors.

The output of the visualization application 301 is a collection $F=\{F_1, F_2, \ldots F_n\}$ of sets of video fragments. That is, $F_k$ are the retrieved video fragments corresponding to time interval $(t_k, t_k+d_k)$. In general, more than one fragment is returned for every time anchor.

In certain embodiments, the original video stream is decomposed and indexed as a single fragment, and durations are fixed to a value d for all time anchors. The visualization application 301 thus returns a clip or fraction of duration d of the original video stream for every anchor $t_k$. In this case, the collection F is simply a series of video clips, where video clip k corresponds to timeline $(t_k, t_k+d)$.

Returning to FIG. 3, once a focalized visualization has been generated, the focalized visualization is demuxed into individual fragments by demuxer 303. Additionally, identifiable human subjects in the focalized visualization are labeled with a unique identifier and are tracked throughout the visualization by face tagging module 305.

In one embodiment, given a labelled set of image templates corresponding to the faces of known subjects, identifiable faces contained in the input fragments are labelled/tagged with the provided identifiers. These image templates and identifiers are provided to the face tagging module 305 as an input for the face tagging process.

The face tagging process may include the steps of face detection, face recognition, and face tracking.

Face Detection:

Most conventional face detection methods are suited for and are reliable to detect faces in a frontal view of a human subject. However, given that in a focalized visualization comprising people performing different activities, a frontal view of the face of a subject may not be visible at all times. In order to deal with such cases, the face tagging module 305 may iterate through each frame of the focalized visualization and attempt to detect faces. The potential detected faces can be ranked based on a confidence level and the face tagging module 305 may identify those potential detected faces as detected faces when the confidence level satisfies a threshold. It should be noted that a face may be detected in any frame of the focalized visualization.

Face Recognition:

Once the face tagging module 305 has satisfactorily detected a face, the face tagging module 305 tags/labels the face as either known (e.g., associates the face with a known identifier) or unknown (e.g., assigns a random unique identifier to the unknown face). The face tagging module 305 may identify a detected face using known image recognition techniques such as template matching or using a trained neural network or other machine learning approaches.

Face Tracking Across Video Fragments:

Once the face tagging module 305 has tagged/labeled a detected face in a frame of the focalized visualization, the face tagging module 305 iterates again through the frames of the focalized visualization and tracks the human subject associated with the identifier. It should be noted that the identified face may be first identified in any frame of the focalized visualization and the subject is tracked in preceding and subsequent frames in a single video fragment and in preceding and subsequent frames of all associated video fragments. It should also be noted that in some frames the face of a human subject may not be visible for identification, but a subject tagged in another frame may continue to be tracked by linking the face identifier to the human subject generally and tracking the movement of the subject.

Once the face tagging module 305 has tracked a face across the focalized visualization, this procedure can be subsequently performed to identify all identifiable subjects in the visualization. Therefore, given that the face tagging module 305 starts with a set of potential known faces in a focalized visualization, the face tagging module 305 can tag and track each face until there are no more faces to be tracked or tagged.

Figure 5:
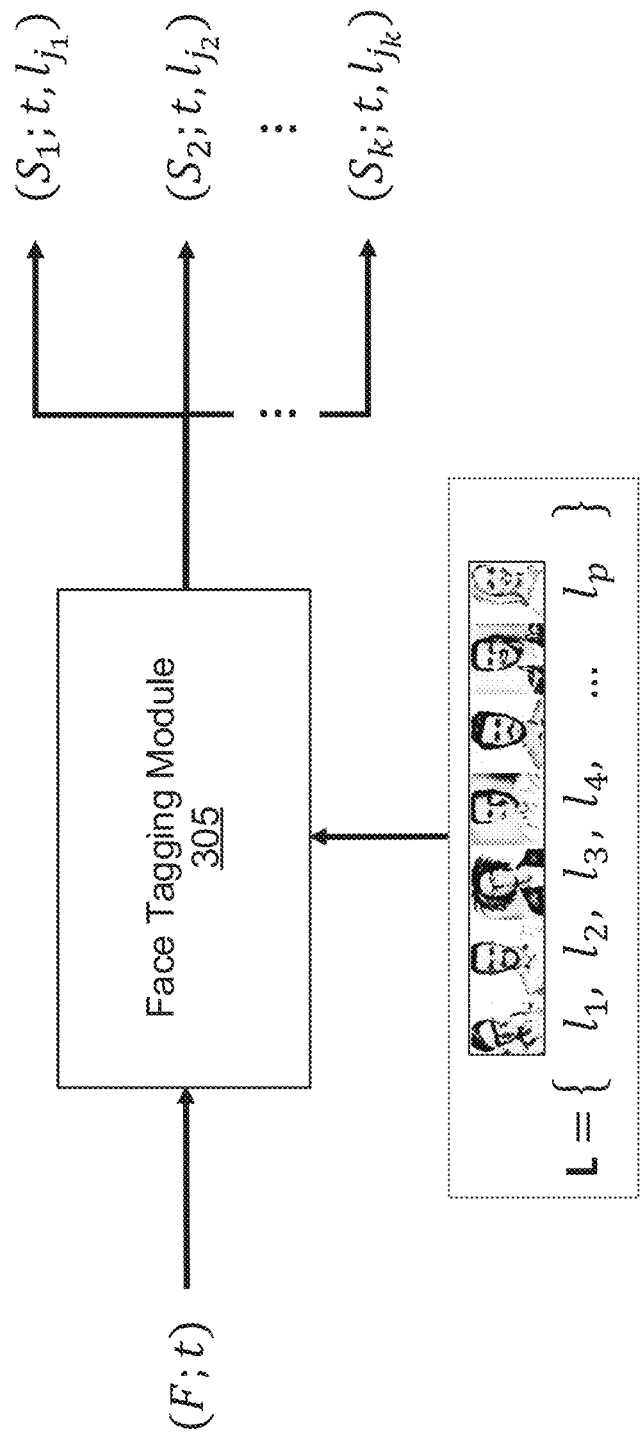
FIG. 5 illustrates the inputs and output of the face tagging module according to the techniques described herein.

FIG. 5 illustrates the inputs and output of the face tagging module 305 according to the techniques described herein. The set of labels $L=\{l_1, l_2, \ldots l_p\}$ and image templates of the faces of p known subjects are provided to the face tagging module 305 as an input. Note that given a fragment in the focalized visualization, the face tagging operation may produce multiple outputs $S_1, S_2, \ldots$ for the same anchor t, where the kth output $S_k$ is assigned a label $l_{j_k}$. This is because a fragment may contain more than one subject. In a sense, this block is also "demuxing" the content, but based on the human subjects present in the focalized visualization.

While tagging/labeling and tracking is described above with reference to facial recognition, it should be understood that other methods of identifying a particular human subject may be used to identify and track a subject. For example, the face tagging module 305 may be configured to identify a human subject by other unique characteristics, such as the gait of the subject or a template of the entire figure of the subject.

Returning to FIG. 3, after the face tagging module 305 has identified the subjects in a focalized video stream, the behavior analysis module 307 determines behavioral aspects associated with each identified subject. The behavior analysis module 307 may determine the behavioral aspects of a subject, based on the application, using one of a number of analyzer modules (described below with reference to FIG. 6). For example, if the query is to determine which subjects in the focalized visualization are distracted or paying attention (e.g., during a training or meeting, at a work station, etc.) the behavior analysis module 307 may use a distraction analyzer module. In one embodiment, the distraction analyzer module may determine the head position of the identified subject and associate a score based on the direction of attention. Thus, a possible distraction score is provided. In another embodiment, the distraction analyzer module may analyze the whole body of the identified subject to determine position or action. In this way, a more accurate score of distraction may be determined. Similarly, if the query is to determine the direction a particular subject is facing (e.g., while the subject is standing at a work station), the behavior analysis module 307 may use a gaze analyzer module. Further, if the query is to determine an emotion of the identified subject, an emotion analyzer module may use an emotion recognition algorithm to determine a score based on the recognized emotions of the subject. It should be apparent that any number of analyzer modules may be used to determine a score for any number of behavioral attributes. Additionally, an aggregate or total score may be calculated across attributes with various attribute scores being weighted differently.

In one embodiment, the score may be binary (e.g., 0 or 1) or confidence value which indicates to what extent the correct behavioral attribute is detected. For example, if the attribute to be determined is if the person is paying attention or distracted, the score may be 1 if the person is looking in a particular direction and 0 otherwise.

Figure 6:
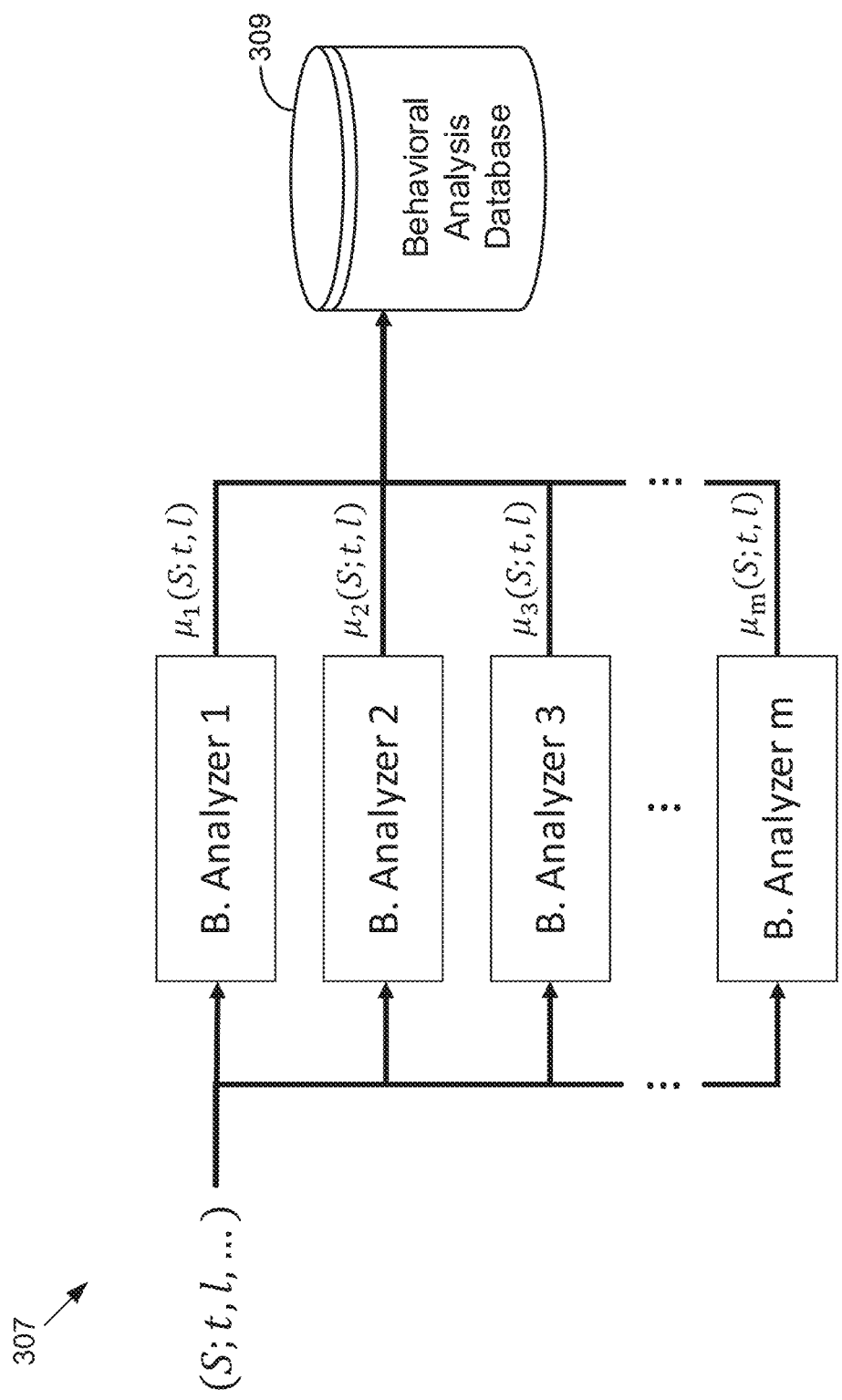
FIG. 6 illustrates a bank of behavioral analyzers of behavior analysis module according to the techniques described herein.

FIG. 6 illustrates a bank of behavioral analyzers of behavior analysis module 307. Each analyzer in the bank focuses on one aspect of behavior. For example, one analyzer can determine whether a subject is distracted, whereas a second analyzer can determine mood/emotion. In one embodiment, a behavioral analyzer determines a score based on the direction of a person's head thus providing a possible distraction score. In a more complicated embodiment, a behavioral analyzer computes a score based on whole-body analysis of a person.

In general, the input to a behavioral analyzer is a triplet (S; t, l, . . . ), where S is a video clip containing a human subject, t is a time anchor, and l a labelling attribute (such as the person's name or other unique identifier). Often, it is difficult for a behavioral analyzer to handle situations where more than one subject is contained in the input video clip. To handle this situation, the behavior analysis module may select a video clip S that contains a single person or introduce a set of bounding boxes delimiting the position of the subject in the video clip.

The output of a behavioral analyzer is a score $\mu(S; t, l)$, which is then indexed in a database 309 (the behavior analysis database 309) using (t,l) as attributes. For an entire bank of behavioral analyzers applied to the triplet (S; t, l, . . . ), the full output $\mu_1, \mu_2, \ldots \mu_m$ is indexed using (t,l) as attributes. In general, given n time anchors, p known subjects, and a bank of m behavioral analyzers, the system will introduce at most n×p×m entries in the database 309, indexed using (t,l) as attributes.

Figure 7:
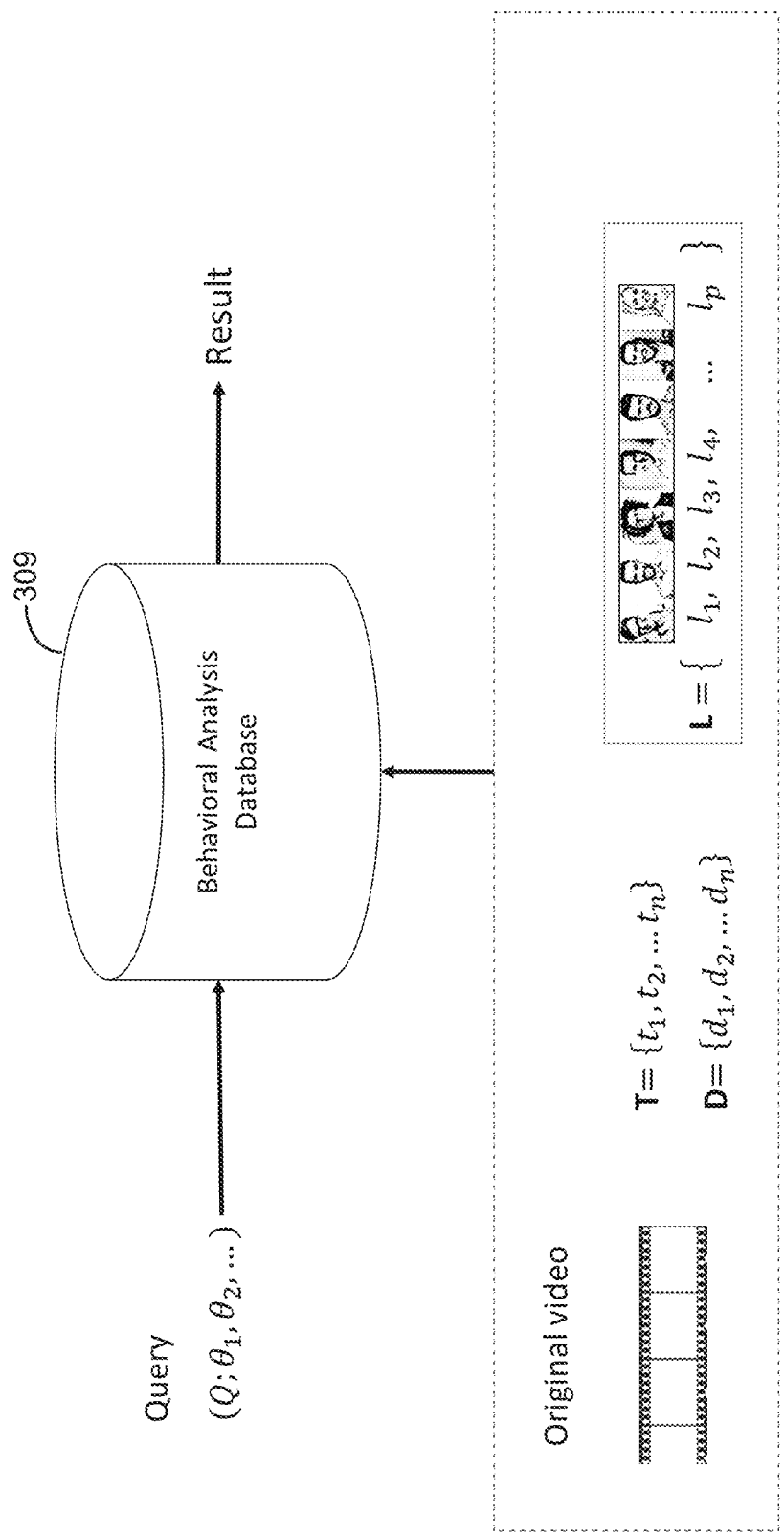
FIG. 7 illustrates a query submitted to the behavioral analysis database according to the techniques described herein.

FIG. 7 illustrates a query submitted to the behavioral analysis database 309. A video file, a set of time anchors (T), a set of durations (D), and a set of labelled image templates of known faces (L) are provided as initialization parameters to the behavioral analysis database 309. As described elsewhere herein, certain operations may be done prior to the query. For example, the visualization application 301 may decompose the original video stream into salient fragments and decompose the salient fragments further into segments. The visualization application 301 may then store the salient fragments in a database and the segments in persistent storage. The visualization application 301 may then generate a focalized visualization for time anchors $t_k$ as a set of video fragments $F_k$ corresponding to the time interval $(t_k, t_k+d_k)$. Additionally, the face tagging module 305 may label or tag faces contained in the focalized visualization with corresponding unique identifiers.

In one embodiment, the output of a behavioral analyzer is stored in a separate table with each table indexed using (t,l) as attributes. If the set of time anchors and the set of labels do not contain duplicates, each pair (t,l) is unique and thus acts as table key (it uniquely identifies each row of data values in the table). That is, given a pair (t,l), the behavior score $\mu_k$ computed by the kth analyzer can be retrieved from the kth table.

The set of tables can be organized in a database (such as the behavioral analysis database 309) that responds to queries. For example, a select query returns the entries from a specified table matching a time interval or set of labels provided as selection conditions. In one embodiment, the query is an average over the entries matching the selection conditions. In another embodiment, the query is the maximum (or minimum) over the entries matching the selection conditions.

In general, a query takes the form $(Q; \theta_1, \theta_2, \ldots )$, where Q indicates the type of query and $\theta_1, \theta_2, \ldots$ are the selection criteria. An example query can be to return all scores for the nth subject/label for a particular analyzer. In another example, the query can be the average score $\bar{\mu}_k(l_n)$ across all time anchors for the nth subject. Alternatively, the query can be the average score $\bar{\mu}_k(t_n)$ across all subjects at the nth time anchor. In yet another example, the query can be the global average $\bar{\mu}_k$ across all subjects and all time anchors.

Focalized behavioral analysis also permits contrasting behavioral analysis or A/B analysis. That is, analyzing the relative difference in behavior between two set of alternatives. For example, one may want to compare the relative effectiveness of two versions of an ad in digital signage. Alternatively, one may want to understand the relative mood of attendees given two keywords in a meeting.

In one embodiment, a contrastive behavior score is computed subsequent to the behavioral analysis. A first query using a first set of selection criteria is performed in order to produce a baseline or control. A second query using a second set of selection criteria is used to produce the test. The results from both queries are compared afterwards to generate the contrastive behavior score.

The query used to produce the test should be commensurate to the query used to produce the baseline. In one embodiment, the first query produces the average attention across time for subject A. A second query produces the same average but for subject B. Each query produces an average attention score computed across time, only one is focused on subject A and the other on subject B. Both queries produce commensurate results that can be compared, added or subtracted. The average attention of subject B can thus be computed relative to subject A and can be used to generate a contrastive behavior score.

Figure 8:
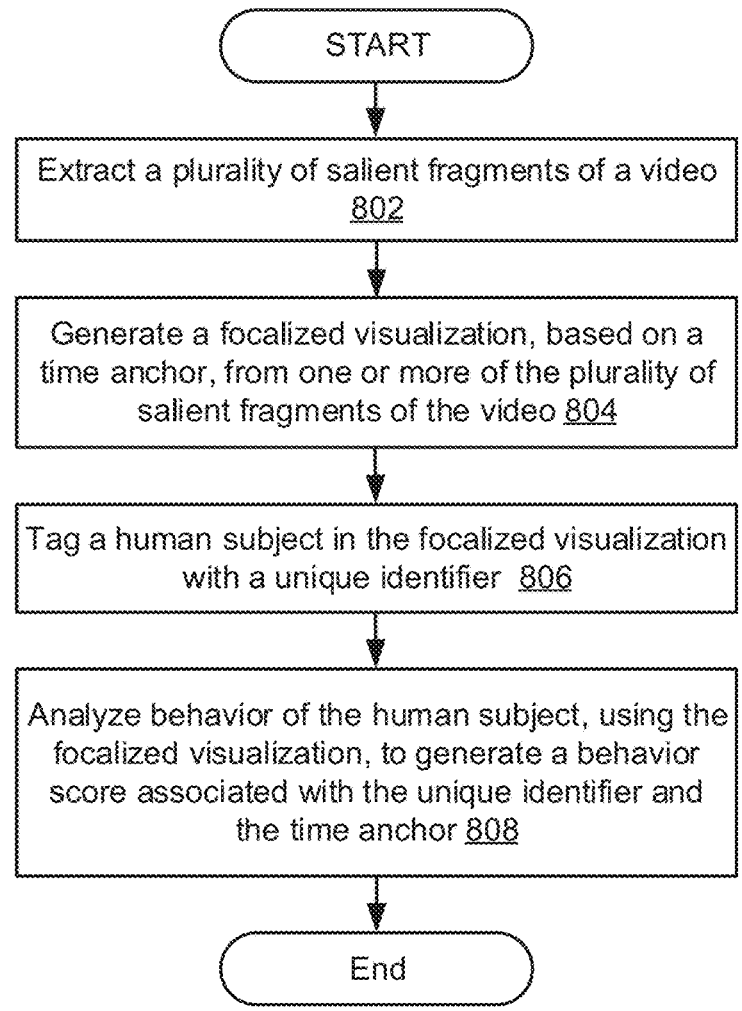
FIG. 8 depicts a flow diagram illustrating one embodiment of a method for generating focalized behavioral measurements from a video stream.

FIG. 8 depicts a flow diagram illustrating one embodiment of a method 800 for generating focalized behavioral measurements from a video stream. At 802, a video processing application extracts a plurality of salient fragments of a video. At 804, the visualization application generates a focalized visualization, based on a time anchor, from one or more salient fragments of the plurality of salient fragments of the video. At 806, the face tagging module tags a human subject in the focalized visualization with a unique identifier. At 808, the behavioral analysis module analyzes behavior of the human subject, using the focalized visualization, to generate a behavior score associated with the unique identifier and the time anchor. As described herein, the behavior score may be stored in a behavioral analysis database to respond to queries.

Figure 9:
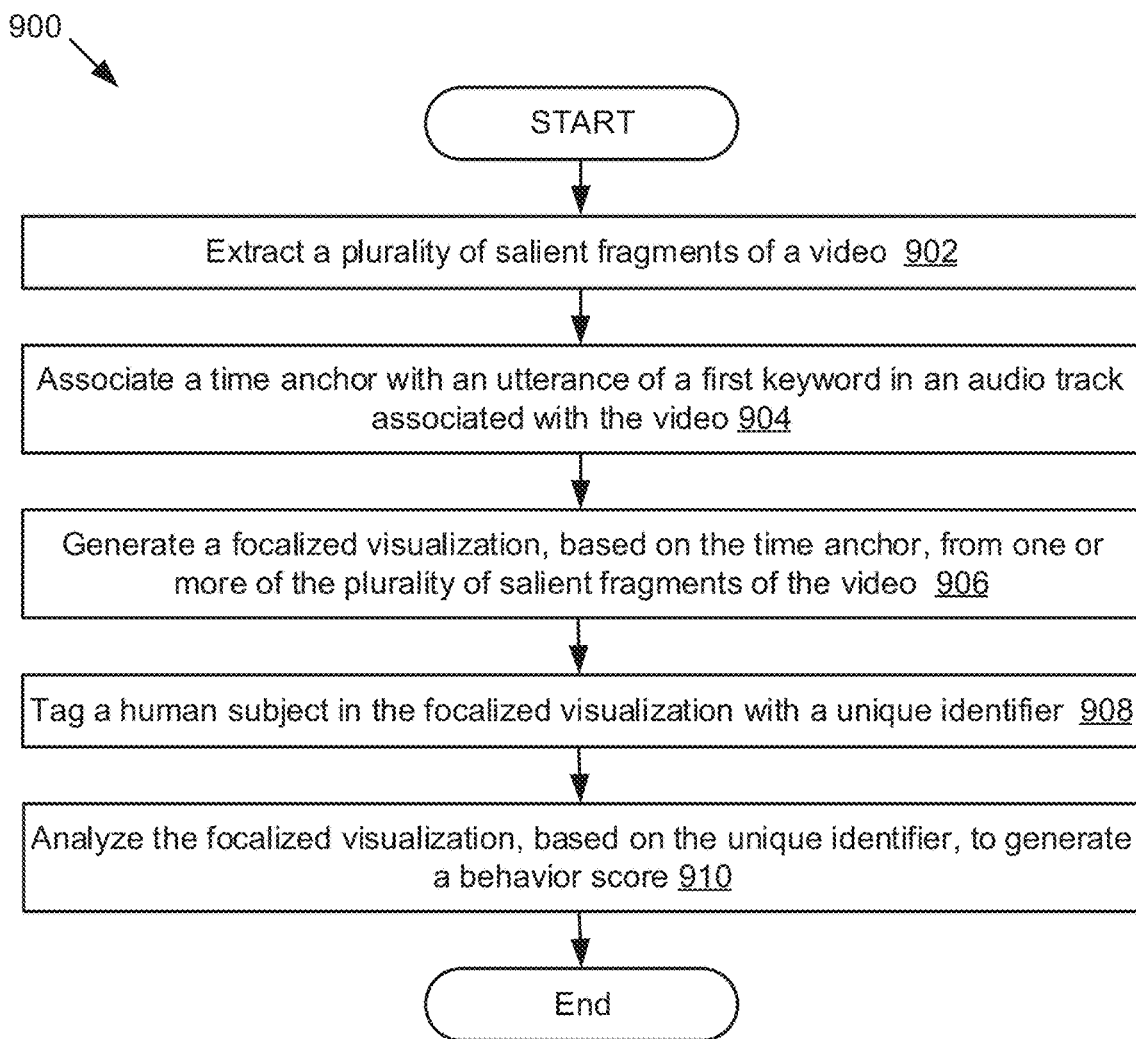
FIG. 9 depicts a flow diagram illustrating one embodiment of a method for generating focalized behavioral measurements from a video stream based on a keyword analysis.

FIG. 9 depicts a flow diagram illustrating one embodiment of a method 900 for generating focalized behavioral measurements from a video stream based on a keyword analysis. At 902, a video processing application extracts a plurality of salient fragments of a video. At 904, the video processing application associates a time anchor with an utterance of a first keyword in an audio track associated with the video. When applying the analysis to meetings, training sessions, lectures, or the like, it may be advantageous to perform the behavioral analysis focused on a set of keywords. For example, one can measure the attention from attendees when a critical term is uttered in a meeting or when an important safety term is mentioned during a training session.

Given a list keywords $\mathbb{K}=\{\mathbb{k}_1, \mathbb{k}_2, \ldots \mathbb{k}_q\}$ of length q and an audio track, the block produces a set of time anchors $T=\{t_1, t_2, \ldots t_n\}$ that contains all the instances when a keyword in $\mathbb{K}$ is uttered in the audio track. For every $t \in T$, there is a corresponding keyword $\mathbb{k}(t) \in \mathbb{K}$. That is, there are n pairs $(t_1, \mathbb{k}_{t_1}), (t_2, \mathbb{k}_{t_2}), \ldots (t_n, \mathbb{k}_{t_n})$ relating time anchors to keywords.

At 906, the visualization application generates a focalized visualization, based on the time anchor, from one or more of the plurality of salient fragments associated with the video. At 908, the face tagging module tags a human subject in the focalized visualization with a unique identifier. At 910, the behavioral analysis server analyzes behavior of the human subject, using the focalized visualization, to generate a behavior score associated with the unique identifier and the first keyword. As described herein, the behavior score may be stored in a behavioral analysis database to respond to queries.

In one embodiment, the output of each behavioral analyzer is stored in a separate table with each table indexed using keywords as attributes. Given the set of keywords and the set of labels (identifying subjects), a pair ($\mathbb{k}$, l) is not necessarily unique. This is because a particular keyword can be uttered at multiple instances in the audio track.

The set of tables can be organized in a database that responds to queries with selection conditions based on keywords. For example, a select query returns the entries from a specified table matching a set of keywords. In one embodiment, the query is an average over the entries matching the selection conditions. In another embodiment, the query is the maximum (or minimum) over the entries matching the selection conditions.

In one embodiment, the query returns the average score $\bar{\mu}_k(\mathbb{k}, l_n)$ over all occurrences of keyword $\mathbb{k}$ for the nth subject/label as computed by the j-th analyzer. In another example, the query can be the average score $\bar{\mu}_j(l_n)$ from the j-th analyzer across all keywords for the nth subject. Alternatively, the query can be the average score $\bar{\mu}_j(\Bbbk)$ from the j-th analyzer over all occurrences of keyword $\Bbbk$ and across all subjects. In yet another example, the query can be the global average $\bar{\mu}_j$ from the j-th analyzer across all subjects and all keywords.

Contrasting or A/B analysis can be based on two sets of keywords to analyze the relative difference in behavior between two set of alternatives. In the simplest embodiment, a single keyword $\Bbbk_1$ is offered as a baseline or control, while a second single keyword $\Bbbk_2$ is used as the test. For example, a query using $\Bbbk_1$ as selection criteria is used to return the average behavioral response over all meeting attendees, while a second query based on $\Bbbk_2$ is similarly used to return a second average score. Both averages are compared to determine the response of the attendees to utterances of keyword $\Bbbk_2$ with respect to keyword $\Bbbk_1$.

Focalized behavioral analysis also permits contrasting behavioral analysis or A/B analysis. That is, analyzing the relative difference in behavior between two set of alternatives. For example, one may want to compare the relative effectiveness of two versions of an ad in digital signage. Alternatively, one may want to understand the relative mood of attendees given two keywords in a meeting.

Analyzing meetings, lectures and training programs focalized on keywords is most advantageous because it permits different observers to focalize the analysis differently. For example, a trainer wants to understand whether the audience mood as he covered the main points of the training syllabus. The trainer's objective is to improve his delivery of the syllabus. In contrast, a safety officer wants to understand the attention of attendees whenever certain safety terms were covered. Her objective is to ensure compliance with safety rules and determine which individuals need to repeat training. Simply put, the goals of the trainer are quite different from the goals of the safety officer. The present invention thus allows each observer to specify a different set of keywords to conduct the focalized behavioral analysis.

Figure 10:
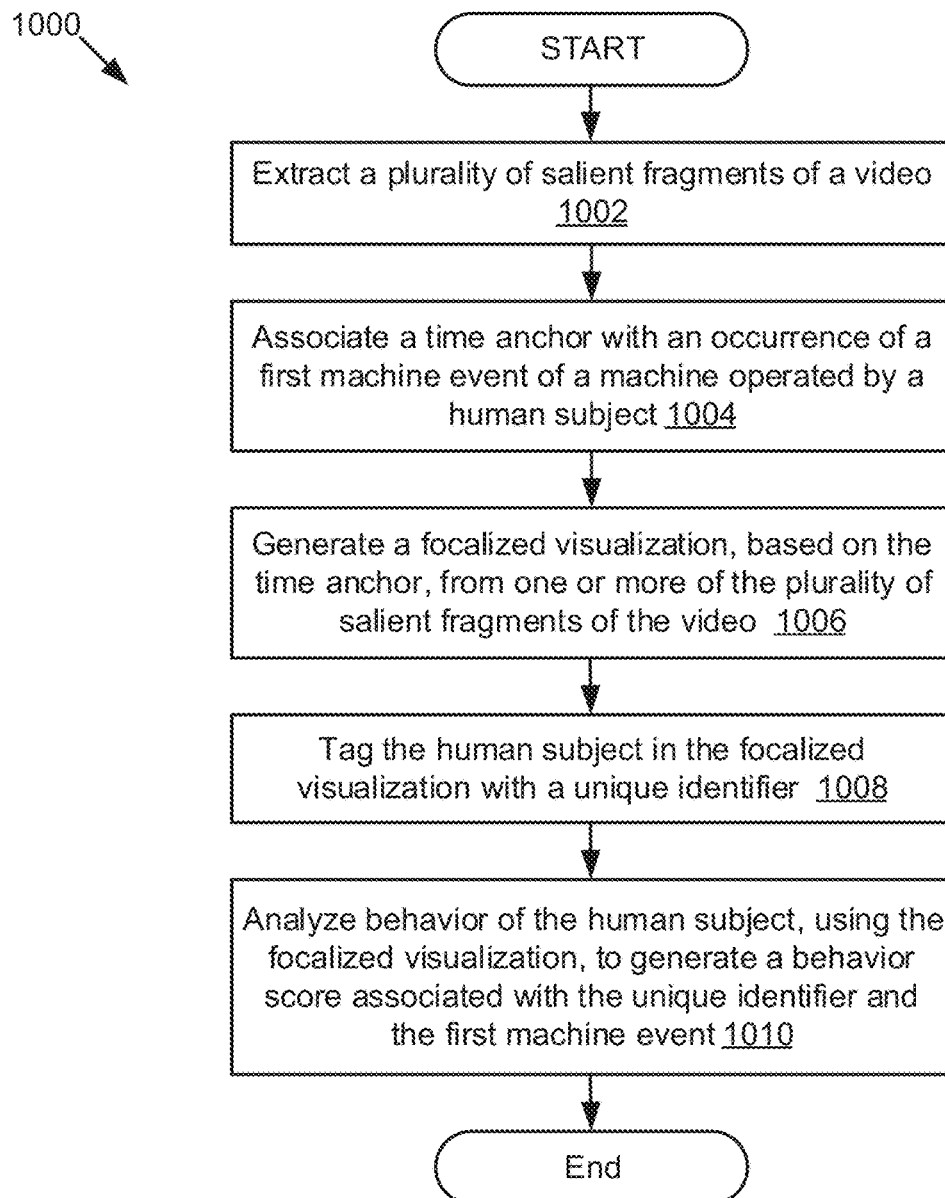
FIG. 10 depicts a flow diagram illustrating one embodiment of a method for generating focalized behavioral measurements from a video stream based on machine events.

FIG. 10 depicts a flow diagram illustrating one embodiment of a method 1000 for generating focalized behavioral measurements from a video stream based on machine events. At 1002, a video processing application extracts a plurality of salient fragments of a video. At 1004, the video processing application associates a time anchor with an occurrence of a first machine event of a machine operated by a human subject. For example, a list of machine events $\mathbb{E}=\{e_1, e_2, \ldots e_q\}$ is used to produce a set of time anchors $T=\{t_1, t_2, \ldots t_n\}$ that contains all the instances when a machine event in $\mathbb{E}$ has occurred. Example of machine events are STOP, RUN, WARNING, READY, HATCH CLOSED, HATCH OPENED, etc. For every $t \in T$, there is a corresponding event $e(t) \in \mathbb{E}$. That is, there are n pairs $(t_1, e_{t_1}), (t_2, e_{t_2}), \ldots (t_n, e_{t_n})$ relating time anchors to machine events.

At 1006, the visualization application generates a focalized visualization, based on the time anchor, from one or more of the plurality of salient fragments of the video. At 1008, the face tagging module tags the human subject in the focalized visualization with a unique identifier. At 1010, the behavioral analysis server analyzes behavior of the human subject, using the focalized visualization, to generate a behavior score associated with the unique identifier and the first machine event. As described herein, the behavior score may be stored in a behavioral analysis database to respond to queries.

In one embodiment, the output of each behavioral analyzer is stored in a separate table with each table indexed using machine events as attributes. Given the set of events and the set of labels (identifying the machine operator in this case), a pair $(e,l)$ is not necessarily unique. This is because a particular machine event can occur at multiple points in time.

The set of tables can be organized in a database that responds to queries with selection conditions based on machine events. For example, a select query returns the entries from a specified table matching a set of machine events. In one embodiment, the query is an average over the entries matching the selection conditions. In another embodiment, the query is the maximum (or minimum) over the entries matching the selection conditions.

In one embodiment, the query returns the average score $\bar{\mu}_j(e,l_n)$ over all occurrences of machine event e for the nth machine operator as computed by the j-th analyzer. In another example, the query can be the average score $\bar{\mu}_j(l_n)$ from the j-th analyzer across all machine events for the nth machine operator. Alternatively, the query can be the average score $\bar{\mu}_j(e)$ from the j-th analyzer over all occurrences of machine event $e$ and across all operators. In yet another example, the query can be the global average $\bar{\mu}_j$ from the j-th analyzer across all machine operators and events.

In this use case, contrasting analysis is based on two sets of machine events to analyze the relative difference in operator behavior between two operational scenarios. In the simplest embodiment, a single machine event $e_1$ is offered as a baseline or control, while a second single event $e_2$ is used as the test. For example, a query using $e_1$ as selection criteria is used to return the average behavioral response over all machine operators, while a second query based on $e_2$ is similarly used to return a second average score. Both averages are compared to determine the response of the operators to occurrences of machine event $e_2$ with respect to machine event $e_1$.

Figure 11:
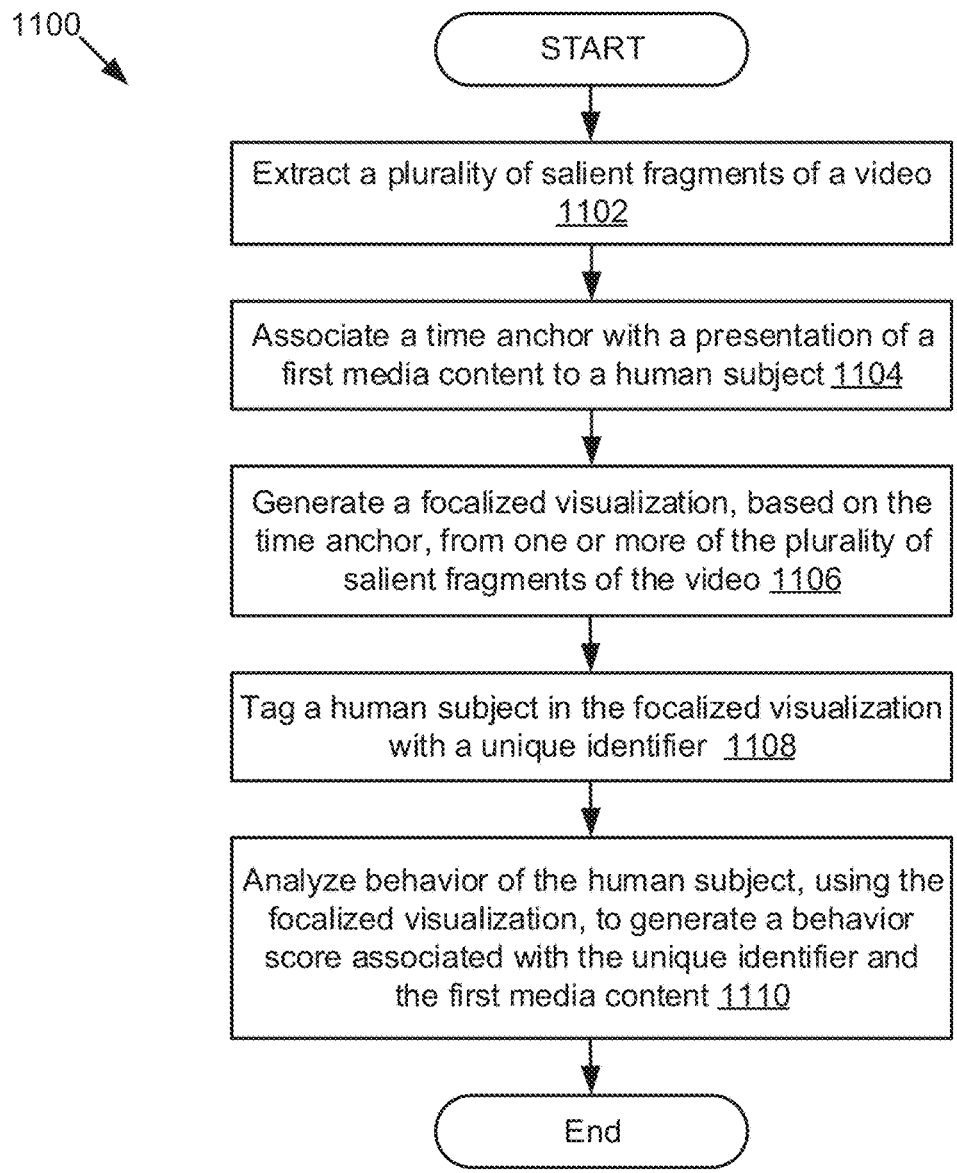
FIG. 11 depicts a flow diagram illustrating one embodiment of a method for generating focalized behavioral measurements from a video stream based on media content.

FIG. 11 depicts a flow diagram illustrating one embodiment of a method 1100 for generating focalized behavioral measurements from a video stream based on media content. At 1102, a video processing application extracts a plurality of salient fragments of a video. The video may be, for example, a surveillance video that captures people observing a piece of media (e.g., a sign, a screen, etc.). At 1104, the video processing application associates a time anchor with a presentation of a first media content to a human subject.

In digital signage and related applications, the set of time anchors may be derived from the media content displayed or shown to the user. In these types of applications, a content management system is used to control the content delivered or displayed to the audience. Generally, a content management system allows content creators to create, customize and review the content. Crucially, a content management system also allows for content scheduling. That is, a media programmer can select the content to show to an audience, and schedule its delivery based on display, location, time and day. In this invention, the presentation time of a content piece is the time when said content piece is shown, displayed or presented to the audience. Content can be an image, video clip, sound, text, audiovisual content or multimedia content. For media content that has a playback duration, the presentation time is when the playback starts.

The set of time anchors can be derived from the information stored in the content management system. In one embodiment, a content list $\mathbb{C}=\{c_1, c_2, \ldots c_q\}$ identifies the content of interest for the purposes of behavior analysis.

That is, given piece of content $c \in \mathbb{C}$, we want to analyze the audience behavior at every instance when said piece of content $c$ is presented to the audience. An element $c$ can be a label, media file, URL locator or any sort of media type identifying the piece of content. The list $\mathbb{C}$ is used to retrieve scheduling information from the content management system. This scheduling information, of course, includes the time of presentation for each piece of content. The set of time anchors $T=\{t_1, t_2, \ldots t_n\}$ thus contains all the instances when a content in $\mathbb{C}$ is presented to the audience. For every $t \in T$, there is a corresponding content $c(t) \in \mathbb{C}$. That is, there are n pairs $(t_1, c_{t_1})$, $(t_2, c_{t_2})$, ... $(t_n, c_{t_n})$ relating time anchors to media content.

Time anchors may be derived based on content elements that represent more granular information than that contained in the content management system. Time anchors may be based on the time when a content element appears in the media content. In some embodiments, a time anchor is associated with the time that a content element such as product, celebrity, character, logo, slogan, catch phrase, or the like, first appears in a video, a jingle is sung, or a phrase is uttered (instead of just the playback starting time). A person skilled in the art will recognize that any feature within a content piece can be used to associate a time anchor.

At 1106, the visualization application generates a focalized visualization, based on the time anchor, from one or more of the plurality of salient fragments of the video. At 1108, the face tagging module tags a human subject in the focalized visualization with a unique identifier. At 1110, the behavioral analysis server analyzes behavior of the human subject, using the focalized visualization, to generate a behavior score associated with the unique identifier and the first media content. As described herein, the behavior score may be stored in a behavioral analysis database to respond to queries.

In one embodiment, the output of each behavioral analyzer is stored in a separate table with each table indexed using media content as attributes. Given the content list and the set of labels (distinguishing the members of the audience in this use case), a pair $(c, l)$ is not necessarily unique. This is because a particular piece of content can be presented at multiple points in time.

The set of tables can be organized in a database that responds to queries with selection conditions based on media content. For example, a select query returns the entries from a specified table matching a content list. In one embodiment, the query is an average over the entries matching the selection conditions. In another embodiment, the query is the maximum (or minimum) over the entries matching the selection conditions.

In one embodiment, the query returns the average score $\bar{\mu}_j(c, l_n)$ over all presentations of $c$ for the nth audience member as computed by the j-th analyzer. In another example, the query can be the average score $\bar{\mu}_j(l_n)$ from the j-th analyzer across all presented content for the nth audience member. Alternatively, the query can be the average score $\bar{\mu}_j(c)$ from the j-th analyzer over all presentations of c and across all audience members. In yet another example, the query can be the global average $\bar{\mu}_j$ from the j-th analyzer across all audience members and presented content.

In this use case, contrasting analysis is based on two sets of content to analyze the relative difference in audience response between two scenarios. In the simplest embodiment, a single content piece $c_1$ is offered as a baseline or control, while a second single content piece $c_2$ is used as the test. For example, a query using $c_1$ as selection criteria is used to return the average behavioral response over all audience members, while a second query based on $c_2$ is similarly used to return a second average score. Both averages are compared to determine the response of the audience to presentations of $c_2$ with respect to presentations of $c_1$.

A system and method for creating, storing, and retrieving focalized behavioral measurements in a video stream has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   extracting a plurality of salient fragments from a video, a salient fragment being a video sequence tracking a salient object through a subset of a series of frames in the video;
   associating a time anchor with an occurrence of a trigger event causing a behavioral response from one or more human subjects in the video;
   generating a video segment focalized on the time anchor associated with the occurrence of the trigger event from one or more of the plurality of salient fragments of the video;
   tagging a human subject of the one or more human subjects in the video segment with a unique identifier; and
   analyzing behavior of the human subject, using the video segment, to generate a behavior score associated with the unique identifier and the time anchor.

2. The computer-implemented method of claim 1, further comprising:
   storing the behavior score as a record in a database using the unique identifier and the time anchor as attributes.

3. The computer-implemented method of claim 2, wherein the unique identifier and the time anchor form a tuple to be used as a database key.

4. The computer-implemented method of claim 2, further comprising:
   performing a query on the database based on selection criteria that is selected from the group consisting of a date of record, the unique identifier, the time anchor, the behavior score, a minimum behavior score, a maximum behavior score, and an average behavior score.

5. The computer-implemented method of claim 1, wherein tagging the human subject comprises:
   detecting a face in a frame of the video segment;
   identifying the face using a template of a known human subject, wherein the template is associated with the unique identifier; and
   associating the face with the unique identifier.

6. The computer-implemented method of claim 1, further comprising:
   tracking the human subject across a plurality of frames of the video segment.

7. The computer-implemented method of claim 1, further comprising:

generating a baseline behavior for a behavioral attribute; and producing a contrastive behavior score by comparing the behavior of the human subject to the baseline behavior.

8. A computer program product comprising a non-transitory computer readable medium storing a computer readable program, wherein the computer readable program when executed on a computer causes the computer to:
extract a plurality of salient fragments from a video, a salient fragment being a video sequence tracking a salient object through a subset of a series of frames in the video;
associate a time anchor with an occurrence of a trigger event causing a behavioral response from one or more human subjects in the video;
generate a video segment focalized on the time anchor associated with the occurrence of the trigger event from one or more of the plurality of salient fragments of the video;
tag a human subject of the one or more human subjects in the video segment with a unique identifier; and
analyze behavior of the human subject, using the video segment, to generate a behavior score associated with the unique identifier and the time anchor.

9. The computer program product of claim 8, wherein the computer readable program when executed on the computer further causes the computer to:
store the behavior score as a record in a database using the unique identifier and the time anchor as attributes.

10. The computer program product of claim 9, wherein the computer readable program when executed on the computer further causes the computer to:
perform a query on the database based on selection criteria that is selected from the group consisting of a date of record, the unique identifier, the time anchor, the behavior score, a minimum behavior score, a maximum behavior score, and an average behavior score.

11. The computer program product of claim 8, wherein to tag the human subject, the computer readable program when executed on the computer further causes the computer to:
detect a face in a frame of the video segment;
identify the face using a template of a known human subject, wherein the template is associated with the unique identifier; and
associate the face with the unique identifier.

12. The computer program product of claim 8, wherein the computer readable program when executed on the computer further causes the computer to:
track the human subject across a plurality of frames of the video segment.

13. The computer program product of claim 8, wherein the computer readable program when executed on the computer further causes the computer to:
generate a baseline behavior for a behavioral attribute; and produce a contrastive behavior score by comparing the behavior of the human subject to the baseline behavior.

14. A system comprising:
one or more processors; and
a memory, the memory storing instructions which when executed cause the one or more processors to:
extract a plurality of salient fragments from a video, a salient fragment being a video sequence tracking a salient object through a subset of a series of frames in the video;
associate a time anchor with an occurrence of a trigger event causing a behavioral response from one or more human subjects in the video;
generate a video segment focalized on the time anchor associated with the occurrence of the trigger event from one or more of the plurality of salient fragments of the video;
tag a human subject of the one or more human subjects in the video segment with a unique identifier; and
analyze behavior of the human subject, using the video segment, to generate a behavior score associated with the unique identifier and the time anchor.

15. The system of claim 14, wherein the instructions further cause the one or more processors to:
store the behavior score as a record in a database using the unique identifier and the time anchor as attributes.

16. The system of claim 15, wherein the unique identifier and the time anchor form a tuple to be used as a database key.

17. The system of claim 15, wherein the instructions further cause the one or more processors to:
perform a query on the database based on selection criteria that is selected from the group consisting of a date of record, the unique identifier, the time anchor, the behavior score, a minimum behavior score, a maximum behavior score, and an average behavior score.

18. The system of claim 14, wherein to tag the human subject, the instructions further cause the one or more processors to:
detect a face in a frame of the video segment;
identify the face using a template of a known human subject, wherein the template is associated with the unique identifier; and
associate the face with the unique identifier.

19. The system of claim 14, wherein the instructions further cause the one or more processors to:
track the human subject across a plurality of frames of the video segment.

20. The system of claim 14, wherein the instructions further cause the one or more processors to:
generate a baseline behavior for a behavioral attribute; and
produce a contrastive behavior score by comparing the behavior of the human subject to the baseline behavior.

* * * * *